(No Model.) 3 Sheets—Sheet 1.
LA VERNE W. NOYES.
METAL SHEARING MACHINE.
No. 397,021. Patented Jan. 29, 1889.
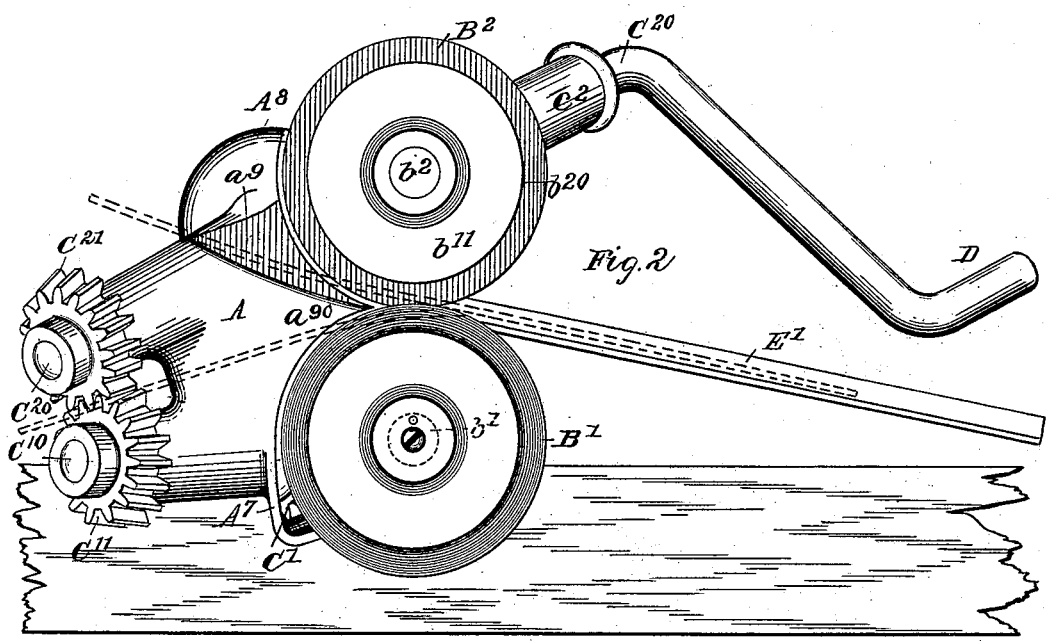
Fig. 2
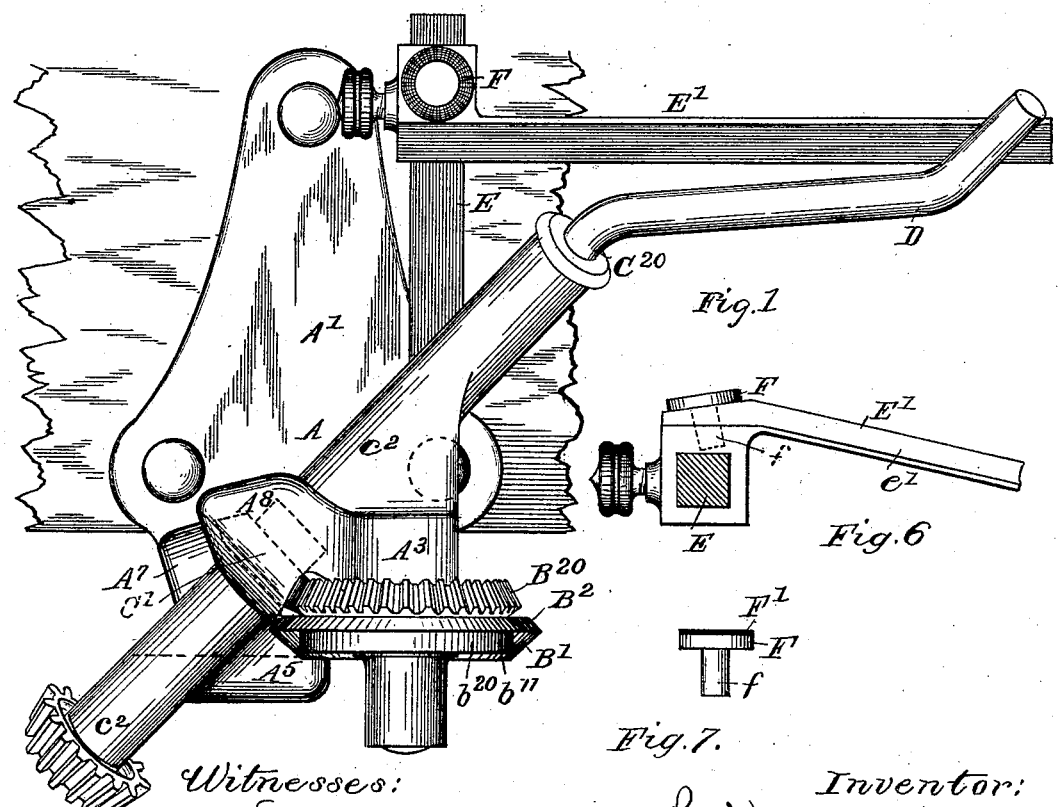
Fig. 1
Fig. 6
Fig. 7.
Witnesses:
C. W. Davenport
Samuel B. Dover.
Inventor:
La Verne W. Noyes
By Burton and Burton
his attys (No Model.) 3 Sheets—Sheet 2.
LA VERNE W. NOYES.
METAL SHEARING MACHINE.

No. 397,021. Patented Jan. 29, 1889.

Witnesses:
C. W. Davenport
Samuel B. Dover

Inventor:
LaVerne W. Noyes
By Burton and Burton
his attys (No Model.) 3 Sheets—Sheet 3.
LA VERNE W. NOYES.
METAL SHEARING MACHINE.

No. 397,021. Patented Jan. 29, 1889.

Witnesses:
Samuel B Dover
Jean Elliott

Inventor:
La Verne W. Noyes
By Burton & Burton
his attys.

UNITED STATES PATENT OFFICE.

LA VERNE W. NOYES, OF CHICAGO, ILLINOIS.

METAL-SHEARING MACHINE.

SPECIFICATION forming part of Letters Patent No. 397,021, dated January 29, 1889.

Application filed August 2, 1888. Serial No. 281,754. (No model.)

*To all whom it may concern:*

Be it known that I, LA VERNE W. NOYES, a citizen of the United States, residing at Chicago, county of Cook, and State of Illinois, have invented certain new and useful Improvements in Metal-Shearing Machines, which are fully set forth in the following specification, reference being had to the accompanying drawings, forming a part thereof.

This invention is an improvement upon the metal-shearing machine shown in my application, Serial No. 271,516, filed April 23, 1888, and now pending in the Patent Office.

The improvement consists in the mode of communicating power to the shearing wheels or disks, the mechanism for that purpose being so arranged that the same machine is adapted to shear sheets of all sizes, the driving gear-wheels being so placed that they can not interfere with the sheet, however extended it may be.

Figure 3:
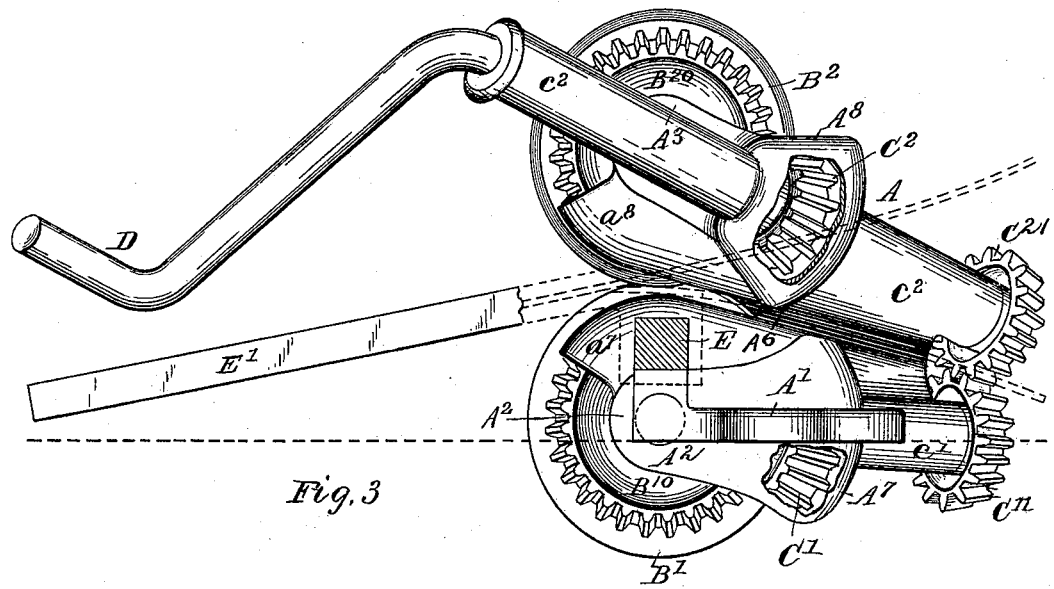
Figure 5:
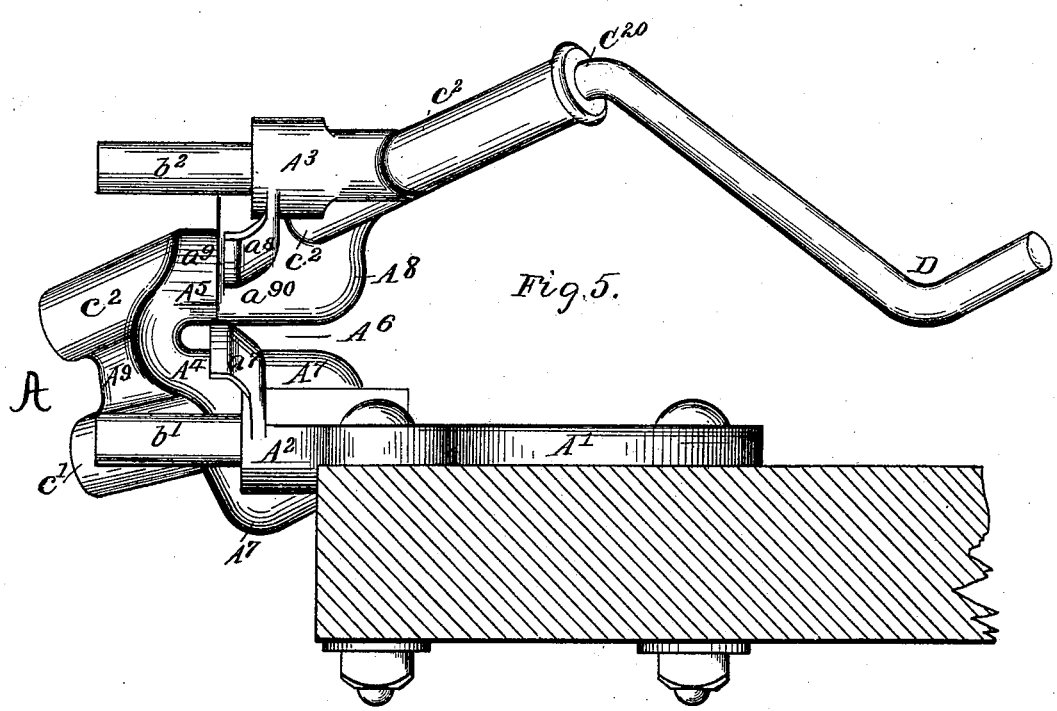
Figure 4:
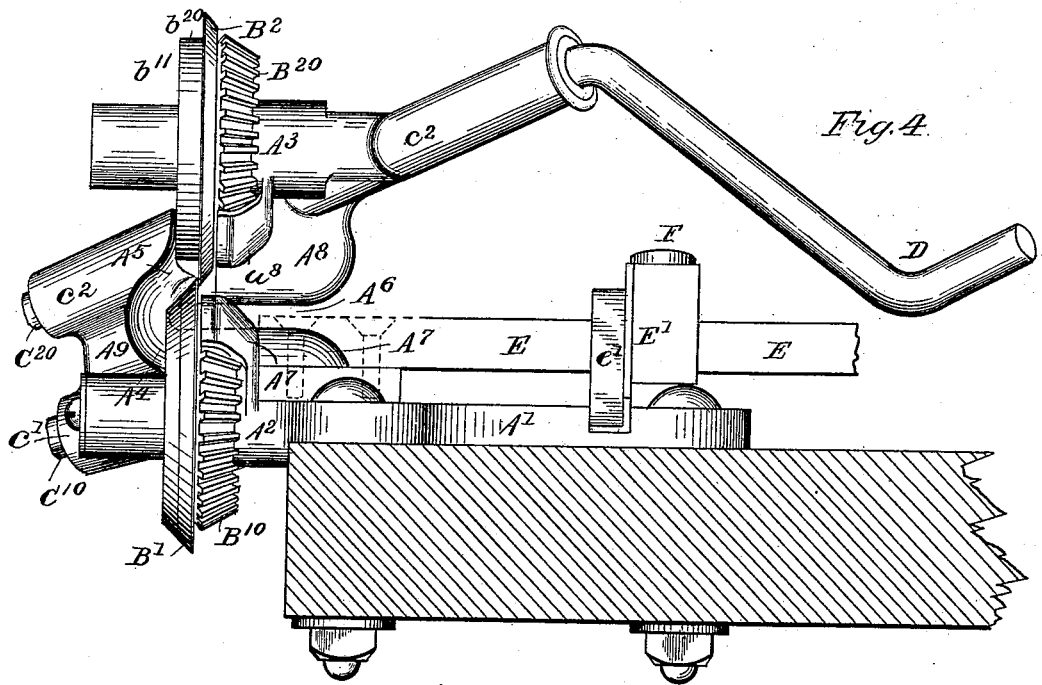
Figure 8:
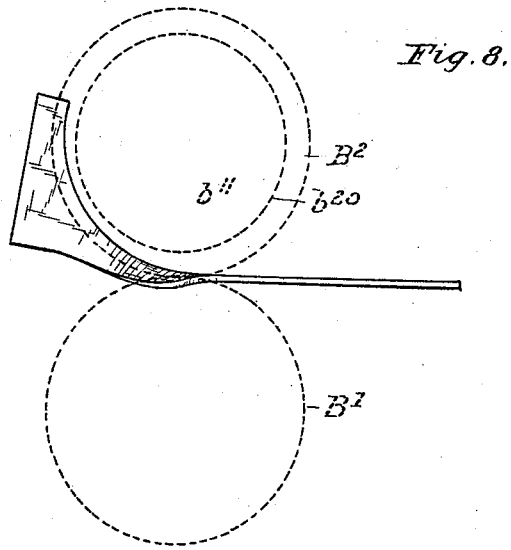

In the drawings, Figure 1 is a plan. Fig. 2 is a left-hand side elevation. Fig. 3 is a right-hand side elevation. Fig. 4 is a front elevation, omitting one pair of intermeshing gears. Fig. 5 is an elevation of the frame stripped of all mechanism seen from the receiving side. Fig. 6 is a section through $y\ y$ on Fig. 1. Fig. 7 is an elevation of a modified form of center-block for centering the sheet for cutting circles. Fig. 8 is a detail side elevation, showing the sheet in the operation of cutting a circle, the cutting-wheels being in dotted line.

A is the frame, which is conveniently cast in a single piece, containing the bearings for all the wheels.

$B'$ is the lower shearing wheel or disk, and $B^2$ the upper shearing wheel or disk. $b'$ and $b^2$ are their shafts, respectively.

$B^{10}$ and $B^{20}$ are beveled gears on the shafts of the shearing-wheels $B'$ and $B^2$, respectively.

$C'$ and $C^2$ are beveled pinions meshing with the beveled gears $B^{10}$ and $B^{20}$, respectively, said pinions being fixed on the shafts $C^{10}$ and $C^{20}$, respectively, said shafts being journaled in bearings in the frame hereinafter particularly described, and having at the opposite ends from the pinions $C'$ and $C^2$ the equal intermeshing beveled gears $C^{11}$ and $C^{21}$.

D is a crank-handle formed upon the produced shaft $C^{20}$, forward of the elongated bearing of said shaft, hereinafter described.

The machine is operated by turning the crank D, thereby rotating the shaft $C^{20}$ and the gears $C^2$ and $C^{21}$ thereon, the former of which meshes with and drives the gear $B^{20}$ and the shaft $b^2$, and thereby rotates the shearing-wheel $B^2$. The latter, $C^{21}$, intermeshes with the gear $C^{11}$, and thereby rotates the shaft $C^{10}$, on which the gear $C'$ is fixed which, revolving with the shaft and intermeshing with the beveled gear $B^{10}$, drives the latter, which, being fixed on the shaft $b'$, rotates the same, and thereby the shearing-wheel $B'$. The gears $B^{10}$ and $B^{20}$ are equal, as are also the gears $C'$ and $C^2$ and the gears $C^{11}$ and $C^{21}$, so that the shearing-wheels $B'$ and $B^2$ receive equal speed.

The substance of this invention consists in the relative positions of the bearings of these several wheels and of the wheels themselves with respect to the several bearings. The construction is designed with a view to permitting the severed parts of the sheet which is divided by the shearing-wheels to pass out beyond the wheels without diverging horizontally, or in the plane of the sheet which is cut, or, to express it otherwise, without diverging from the plane of the shearing-faces of the shearing-wheels, but diverging, one upward and the other downward, from the plane of the original sheet, the cut edges remaining in the same plane at right angles to the plane of the original sheet. This necessitates that there should be an avenue between all the bearings and wheels from the point where the shearing-wheels lap—that is to say, from the cutting-point—which shall be unobstructed outward—that is, in the direction of discharge—and sideward from the cutting-face of each wheel past the cutting-edge of the other wheel, and thence without limit sideward in that direction. As pointed out in my former application above mentioned, this necessitates that the bearings for the two shearing-wheels should have the part which connects them located on the discharge side in the plane of the cutting-faces and extending across that plane, so that that plane will completely traverse such connecting part, and so that a severance of the frame in that plane would completely sever from each other the two bearings of said two wheels. In said former application the said bearings were shown located on opposite sides of the plane of the shearing-faces. In the present construction they are located both on the same side of that plane for reasons of convenience and compactness, which will appear in the further description.

In addition to the necessity for having the part which connects the bearings of the shearing-wheels located as above described, the purpose of the present invention requires also that the train by which the driving-power is communicated to the two shearing-wheels shall nowhere obstruct the avenue of discharge of either of the parts of the severed sheet, and since that train must contact at one end with a wheel on the shaft of one of the shearing-wheels in order to drive it, and at the other end must contact with a wheel on the shaft of the other shearing-wheel, and since said shearing-wheel shafts are of necessity on opposite sides of the plane of the sheet which is cut, it is obvious that the train, which must therefore cross that plane in order not to obstruct the discharge of either of the severed parts of the sheet, must make the crossing from one side to the other of the plane of the sheet by passing through the rift in the sheet made by the shearing-wheels where said severed parts diverge, as described, in opposite directions from the plane of the uncut sheet—that is to say, said train in passing from one side to the other of the horizontal plane of the uncut sheet must also pass from one side to the other of the vertical plane of the cut—that is to say, the plane of the shearing-faces of the shearing-wheels. It is not material, so far as this fundamental principle of construction is concerned, how extended the train of gearing between the two shearing-wheel shafts is made, and for different purposes it may be desirable to adopt different constructions in detail.

The construction which I have herein shown is designed with special reference to convenience in operating by hand and for the purpose of a bench device. It affords also a special advantage of construction in that it avoids the necessity of twisted gears or other irregular or unusual means of communicating motion.

I will now describe in detail the construction of the frame which contains the several bearings, since the location of those bearings and their connections involves the whole principle of the machine.

$A'$ is a flange, by means of which the machine is designed to be attached to a bench or other fixed support. This is preferably, as shown, at the right-hand side of the machine, so that the operator feeding it may stand with his right side toward the bench, as is customary in operating such bench machines.

$A^2$ is the bearing of the shaft of the lower shearing-wheel.

$A^3$ is the bearing of the shaft of the upper shearing-wheel. These bearings are both preferably on the same side of the plane of the shearing-faces of the wheels, because thereby a stronger and more compact frame can be built and the bearings of the intermeshing gears brought nearer to each other and to the gears, respectively, and so less liability of spring in operation is caused.

From the lower bearing, $A^2$, the metal of the frame extends in the neck $A^4$ across the plane of the cut, and then returns back again across that plane in the neck $A^5$, to the bearing $A^3$ of the upper shearing-wheel shaft, leaving between the two necks $A^4$ and $A^5$ the avenue $A^6$, for one of the severed parts of the sheet to pass outward beyond the shearing-wheels. Adjacent to the bearing $A^2$ there is formed the housing $A^7$ for the gear $C'$, whose shaft $C^{10}$ has its bearing $c'$ in the neck $A^4$, said neck and said bearing extending obliquely downward and outward as they cross the plane of the shearing-faces. Adjacent to the bearing $A^3$ there is formed the housing $A^8$ for the gear $C^2$, whose shaft $C^{20}$ has its bearing $c^2$ in the neck $A^5$. The axes of the shafts $C^{10}$ and $C^{20}$ and of their bearings, respectively, are in the same plane, said axes being at such an angle to each other that they would intersect, if at all, considerably to the left of the vertical plane of the cut—i. e., the plane of the shearing-faces. The downward slope of the two bearings $c'$ and $c^2$, combined with their oblique direction toward the discharge side, is sufficient to permit the shafts $C^{20}$, journaled in the upper bearing, to extend upwardly from left to right at some distance above the shaft $C^{10}$, which is journaled in the lower bearing, and still not require its said bearing in the neck $A^5$ to be too far above the plane of the uncut sheet to permit the part of the sheet severed on the left side of the plane of the cut to pass above said bearing and shaft. It will be obvious that the part of the sheet severed on the other side of the cut will pass off between the housings $A^7$ and $A^8$—that is to say, between the shafts $C^{10}$ and $C^{20}$ and between the gears $C'$ and $C^2$ and between the gears $B^{10}$ and $B^{20}$ and above the flange $A'$, that portion of the sheet having entered below the crank-handle D on the shaft $C^{30}$. To facilitate the easy discharge and guidance of the severed parts of the sheet, the metal of the neck is extended forward in a tapering spur, $a^{90}$, which approaches close to the cutting-edge of the wheel $B'$, so that the cutting-edge of the metal severed and turned up by that wheel is engaged and diverted still more upward by the spur whose upper surface merges in the upper surface of the neck $A^5$, and the upper surface of said neck $A^5$ and of the bearing $c^2$ of the shaft $C^{20}$ is dressed off to form a sloping surface, (indicated by the letter $a^9$,) upon and over which the severed part of the sheet on that side is further diverted or made to diverge from the plane of the original sheet as it is discharged past the shearing-wheels.

Similarly, and for a similar purpose, the under surface of the housing $A^8$ and the upper surface of the housing $A^7$ are shaped to form as gradual slopes as possible, by which the right-hand piece of the sheet is made to diverge.

In order to protect the gears $B^{10}$ and $B^{20}$ on the shafts of the shearing-wheels from the metal which is being cut, and which passes over and under them, respectively, and especially to keep small chips out from between the intermeshing gears $B'$ and $C'$ and $B^2$ and $C^2$, I form adjacent to the bearings $A^2$ and $A^3$ the housings $a^7$ and $a^8$, which are opened toward the receiving side of the machine and extended over said gears, respectively, nearly to the vertical plane of the cutting-point of the shearing-wheels, and then gradually slope off to the right and left, respectively, and merge in the sloping faces by which the severed sheets are guided in their discharge, as described.

To the bearing $A^2$ of the lower shearing-wheel I secure a gage-bar, E, which is of any desired length, extending off toward the right, and upon that bar I mount the sliding gage $E'$, which is formed with the rabbet $e'$, on which the edge of the sheet being cut may rest, and by which such sheet will be guided while it is fed through the wheels. In order that the greatest amount of support may be obtained, especially for large sheets, without the necessity of unduly extending said gage toward the receiving side, I so mount the gage on the gage-bar that the former slopes back down toward the level of the bench, so that the sheet may rest on the bench through the greater part of its extent if the sheet is large. This construction also accomplishes another important purpose—viz., that greater space is obtained for the rotation of the crank D, which must of necessity rotate clear above the sheet, and by thus depressing the gage at the receiving end I am able to make it longer without farther extending the shaft $C^{20}$.

This machine is adapted to be constructed in any size for heavy work and for the application of power by merely strengthening the parts to correspond with the thickness of metal to be cut without otherwise changing the dimensions. It may be used to divide sheets of any lateral or longitudinal extent absolutely without limit, because the avenue of discharge for the severed parts of the sheet cut is entirely unobstructed laterally, or on the discharge side, without regard to the extent. It is also well adapted to circular work, the convex piece which is cut by it being, however, most conveniently left at the right hand, although, with obvious changes of construction, it might be made to leave the convex piece on either side of the plane of the cut. In order to facilitate its use as a circular-shearing machine, I provide the center-block F, which comprises a small disk provided with a spindle, $f$, which is journaled in the gage $E'$, the disk lying above the gage, while the spindle merely enters a suitable hole drilled in the upper side of the gage to receive it. The upper surface of the disk F may be knurled or milled to adapt it to hold, with less danger of slipping, the sheet which may rest upon it; and in order to cut perfect circles without marking them the gage will be moved until the center of the center-block F is at a distance from the cutting-point of the shearing-wheels equal to the radius of the circle desired and the metal being placed with the intended center of the circle upon the center of the center-block F. A very moderate pressure by the thumb or finger of the operator upon the upper side of the sheet, directly above the center-block, will keep the sheet precisely in the position desired, and the action of the shearing-wheels in feeding and cutting will rotate it accurately about the center thus fixed, the center-block serving merely as a spindle for the sheet, and turning in its bearing in the gage. Obviously, if desirable, an upper clamp could be extended from the upper portion of the frame—as, for example, from the bearing of the shaft $C^{20}$—and made to hold the metal more positively than by the hand of the operator; but I have found it entirely practicable to operate without such clamp, at least with metal of moderate weight. In operating thus to cut circles the material cut off outside the circle—that is to say, the concave piece—in order to be discharged must curl up around the axis of the upper shearing-wheel, and I am obliged, therefore, to cut away the material of that wheel on that side, so that its shearing-face may continue unobstructed far enough to allow the metal to curl up, as described, without being laterally diverted, which would kink it; but for this necessity it might be desirable that the shearing-face should only extend so much farther than the other wheel laps onto it as the maximum thickness of the metal to be cut, because thereby the wheel might be given greater strength; but for the reason above stated, and for the purpose of adapting the machine to cut small circles, I cut away the upper wheel on the side of the shearing-face somewhat farther back from the cutting-edge than necessary to allow for the thickness of the metal, leaving the shoulder $b^{20}$ as a limit of the annular boss $b^{11}$, which gives strength to the wheel. The outer diameter of this boss, it will be perceived, is the diameter of the minimum circle which can be cut with the machine.

In order to operate with accuracy, the axis of the center-block F must be in a plane at right angles to the plane of the shearing-faces of the wheels and passing through the cutting-point and in a line in such plane which passes through the cutting-points.

If desired, a covering, $F'$, of rubber or leather, or like material, may be provided upon the surface of the center-block F, to increase the certainty of the sheet retaining the position on the block by diminishing the danger of its slipping under the pressure of the hand of the operator.

I claim—

1. In a shearing-machine, in combination with the shearing-wheels, the train of gearing by which they are both revolved, said train being continuous by means of its contacting parts from one wheel to the other, and extending across and being traversed by both the plane of the sheet to be cut and the plane of the cutting-edges of the shearing-wheels, substantially as set forth.

2. In a shearing-machine, in combination with the shearing-wheels, their shafts, and gears on said shafts, respectively, the frame in which said shafts are journaled, having the portion which connects the bearings of said shafts extending across the vertical plane of the shearing-faces of the wheels on the discharge side of the wheels through the rift in the severed sheet, and having bearings for two counter-shafts, one of said counter-shafts extending also through the rift in the severed sheet, intermeshing gears on said shafts, respectively, and a gear on each of them intermeshing with the gears on the shearing-wheel shafts, respectively, substantially as set forth.

3. In a shearing-machine, in combination with the shearing-wheels and the train of gears by which they both are revolved, said train being continuous in and by means of its successively contacting parts from one shearing-wheel to the other, and crossing and being traversed by both the plane of the sheet to be cut and the plane of the cutting-edges of the shearing-wheels, the frame in which the shafts of said train obtain bearings, having the portion which connects the bearings of the two shearing-wheels crossing the plane of the cutting-edges on the discharge side, substantially as set forth.

4. In a shearing-machine, in combination with the shearing-wheels, the frame in which said wheels are journaled, having the part which connects the journal-bearings of said wheels crossing and traversed by the plane of the cutting-edges of the wheels, two counter-shafts journaled in said connecting part, and gear-wheels on them, respectively, and a gear-wheel rigid with each of the shearing-wheels, and intermeshing, respectively, with the said gear-wheels on the counter-shafts, one of said counter-shafts extending across the plane of the cutting-edges of the wheels, substantially as set forth.

5. In a shearing-machine, in combination with the shearing-wheels, the frame having the bearings for said wheels both on the same side of the plane of the cutting-edges and apertured entirely through from receiving to discharging side between said bearings transversely to said plane, such aperture extending in from the side of said plane on which the bearings are located to said plane, substantially as set forth.

6. In a shearing-machine, in combination with the shearing-wheels, the frame having the bearings for said wheels both located on the same side of the plane of the cutting-edges and apertured entirely through from receiving to discharging side between said bearings transversely to said plane, such aperture extending in from the side of the plane on which said bearings are located to said plane, gear-wheels rigid with the shearing-wheels, respectively, and two counter-shafts journaled in the frame, having their axes one above and one below the said aperture, and gears thereon meshing with the shearing-wheel gears, respectively, substantially as set forth.

7. In a shearing-machine, in combination with the shearing-wheels, the frame in which they are journaled, having the portion which connects the journal-bearings of the shearing-wheels located beyond the cutting-point of the wheels toward the discharge side, and having two faces, one upon each side of the plane of the cutting-edges, sloped to divert the severed edges of the metal in opposite directions, substantially as set forth.

8. In a shearing-machine, in combination with the shearing-wheels, the frame in which said wheels are journaled, having the bearings for said wheels both on the same side of the plane of the cutting-edges, the gears $B^{10}$ and $B^{20}$, rigid with said shearing-wheels, respectively, and a train by which said gears are actuated, the housings $a^7$ $a^8$ over said gears, respectively, being formed integral with their journal-bearings, and extending over said gears from the receiving side of the shearing-wheels nearly to the vertical plane of the cutting-point, substantially as set forth.

9. In a shearing-machine, in combination with the shearing-wheels and a train which actuates them, an integral frame having the bearings for the shearing-wheels, the portion which connects said bearings crossing and traversed by the plane of the cutting-edges of the wheels on the discharge side, bearings for the driving-train in said connecting portion, housings for the gears, and guiding-surfaces for the discharge of the metal, all substantially as set forth.

10. In combination, substantially as set forth, the shearing-wheels and their driving-train, said train comprising a shaft which, from a point located on one side of the plane of the cutting-edges beyond the vertical plane of the cutting-point toward the discharge side, extends obliquely toward the opposite side of the plane of the cutting-edges and away from the plane of the sheet to be cut and toward the receiving side of the wheels, and a handle on said shaft by means of which it may be rotated.

11. In combination, substantially as set forth, the shearing-wheels and the frame in which they are journaled, having bearings for said wheels both on the same side of the plane of the cutting-edges, and the aperture $A^6$ between said bearings, the housings $A^7$ and $A^8$, adjacent to said bearings, respectively, one above and one below said aperture, the counter-shafts $C^{10}$ and $C^{20}$, extending one above and one below said aperture and having fixed on them the gears located in said housings, respectively, and the gears $B^{10}$ and $B^{20}$, rigid with the shearing-wheels and driven by the housed gears, substantially as set forth.

12. In a shearing-machine, the frame comprising the bearings of the shearing-wheels, both on the same side of the plane of the cutting-edges, and the bearings for the counter-shafts, both located on the opposite sides of said plane, substantially as set forth.

13. In a shearing-machine, in combination with the shearing-wheels and the gears on their shafts, through which they receive motion, a pair of counter-shafts having gears which drive the shearing-wheels, respectively, and having their axes located in a plane oblique to the plane of the axes of the shearing-wheels, intermeshing gears on said shafts respectively located on the opposite sides of the plane of the cutting-edges of the shearing-wheels from that at which the plane of the axes of said counter-shafts intersects the plane of the axes of the shearing-wheels, substantially as set forth.

14. In a shearing-machine, in combination with the shearing-wheels, the frame in which they are journaled, having the bearings for the shearing-wheels on the same side of the plane of the cutting-edges and apertured between said bearings from one side to the plane of the cutting-edges, gears rigid with the shearing-wheels, respectively, counter-shafts journaled in said frame, having on them gears which actuate, respectively, the shearing-wheel gears, said counter-shafts having their bearings on the opposite side of the plane of the cutting-edges from that of the aperture between the shearing-wheel bearings, the axes of said counter-shafts being in the same plane, and that plane being oblique to the plane of the axes of the shearing-wheels and intersecting said plane on the opposite side of the plane, of the cutting-edges of the wheels from the bearings of said counter-shafts, substantially as set forth.

15. In a metal-shearing machine, in combination with the shearing-wheels, the center-block F, having its face substantially in the plane of the sheet to be cut, and journaled in a bearing which is adjustable laterally with respect to the plane of the cutting-edges, the axis of said bearing being transverse to the plane of the sheet, said block turning freely in its said bearings, substantially as and for the purpose set forth.

16. In a shearing-machine, in combination with the shearing-wheels, the center-block F and the bearing in which it is journaled, adjustable laterally in respect to the shearing-faces of the wheels, the face of said center-block being substantially in the plane of the sheet to be cut and surfaced with rubber or like material, whereby the sheet may be kept from slipping upon it, substantially as set forth.

In testimony whereof I have hereunto set hand, in the presence of two witnesses, at Chicago, this 30th day of July, 1888.

LA VERNE W. NOYES.

Witnesses:
 E. F. BURTON,
 JEAN ELLIOTT.